Figure 1:
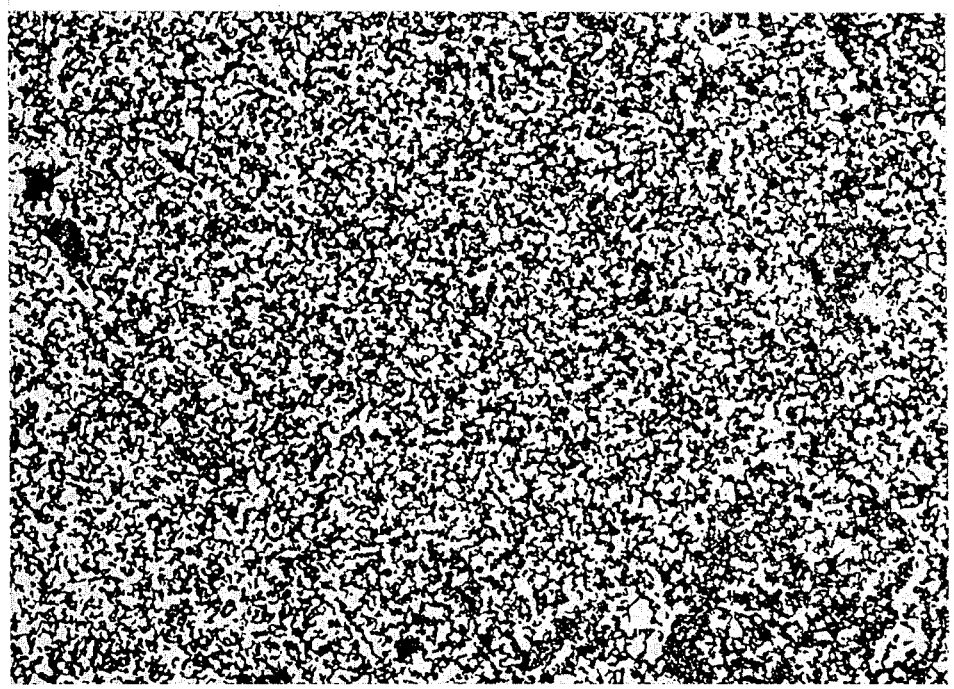

United States Patent [19]

Greskovich et al.

[11] 4,040,848

[45] Aug. 9, 1977

[54] POLYCRYSTALLINE SILICON ARTICLES CONTAINING BORON BY SINTERING

[75] Inventors: Charles D. Greskovich; Joseph H. Rosolowski, both of Schenectady, N.Y.

[73] Assignee: General Electric Company, Schenectady, N.Y.

[21] Appl. No.: 646,969

[22] Filed: Jan. 6, 1976

[51] Int. Cl.$^2$ .................. C01B 33/00; C01B 35/02; C04B 35/16
[52] U.S. Cl. ................................. 106/73.5; 264/65; 423/289; 423/344
[58] Field of Search .................. 106/73.5; 264/56, 65; 423/348, 349, 344, 289

[56] References Cited

U.S. PATENT DOCUMENTS

| | | | |
|---|---|---|---|
| 2,419,237 | 4/1947 | Treuting | 423/348 |
| 3,120,451 | 2/1964 | Schmidt et al. | 423/349 |
| 3,147,141 | 9/1964 | Ishizuka | 423/349 |
| 3,212,853 | 10/1965 | Wentorf, Jr. et al | 423/348 |
| 3,212,922 | 10/1965 | Sirtl | 423/349 |
| 3,778,231 | 12/1973 | Taylor | 423/344 |

*Primary Examiner*—Patrick P. Garvin
*Assistant Examiner*—Mark Bell
*Attorney, Agent, or Firm*—Jane M. Binkowski; Joseph T. Cohen; Jerome C. Squillaro

[57] ABSTRACT

A polycrystalline silicon body is produced by forming a particulate mixture of silicon powder having an average particle size less than 3 microns and boron in an amount ranging from 0.1% to 5% by weight of the silicon powder, shaping the particulate mixture into a green body and sintering the body to a density of at least 60% of the theoretical density of silicon.

9 Claims, 1 Drawing Figure

POLYCRYSTALLINE SILICON ARTICLES CONTAINING BORON BY SINTERING

The invention herein described was made in the course of or under a contract or subcontract thereunder (or grant) with the Department of the Navy.

The present invention relates to a method of producing a novel sintered polycrystalline silicon body.

In silicon device technology there is a great need for inexpensive noncontaminating support material for single crystal silicon wafers undergoing the necessary diffusion and oxidation processes in a high temperature furnace. Primary requirements of the support material are that it not contaminate nor affect the quality of the silicon wafers, and that it be strong and have good thermal shock resistance. Fused silica ($SiO_2$) has been the most widely used support material but has temperature limitations at or below 1250° C because of the problems of deformation and devitrafication after long times at higher temperatures. Furthermore, and most importantly, recent investigations have shown that during high temperature processing dislocations form in the silicon wafers in the vicinity of the contact region between the wafer and the fused silica support and is related to the different thermal expansion coefficients of the silicon wafer and the fused silica. Dislocations in silicon are known to adversely affect many of the desirable properties, one of such is electrical conductivity.

In order to avoid many of the material problems with fused silica, polycrystalline silicon tubes and boats have been prepared by chemical vapor deposition (CVD). This polycrystalline silicon can be made with high purity, good strength up to 1400° C and good thermal shock resistance. And, of course, it has the same coefficient of thermal expansion as the silicon wafers so that the formation of dislocations in the silicon wafers can be avoided. Some of the major problems with this (CVD) method are: (1) the deposition rate is usually low and therefore time consuming; (2) the deposited silicon is highly textured and is susceptible to residual mechanical stresses which cause cracking in the formed body; (3) silicon deposition usually takes place on a graphite substrate at temperatures exceeding 1000° C and the problem of SiC formation at the silicon/graphite interface must be prevented so that the formed silicon body can be easily separated from the substrate after deposition; (4) boats are made by diamond sawing appropriate sized pieces from larger circular or rectangular shaped tubes and occasionally exhibit fracture caused by residual stresses frequently found in thick-walled material.

In accordance with the present invention, novel polycrystalline silicon bodies are produced by a sintering process which is more economical than the CVD approach and eliminates many of the problems associated with the CVD approach. Specifically, in the present invention a polycrystalline silicon body of desired density is produced by sintering a compact of silicon powder containing boron by solid or liquid state sintering. The density of the sintered body depends on its application and can range from 60% to 100% of the theoretical density of silicon.

Those skilled in the art will gain a further and better understanding of the present invention from the detailed description set forth below, considered in conjunction with the FIG. 1 which is a photomicrograph (magnified 100 ×) of a sectioned and polished surface of the present sintered body having a density of 61% of the theoretical density of silicon and showing its open interconnecting pore structure.

In copending U.S. patent application, Ser. No. 646,968 entitled "Polycrystalline Silicon Articles By Sintering" filed of even date herewith in the names of Charles D. Greskovich and Joseph H. Rosolowski and assigned to the assignee hereof there is disclosed a polycrystalline silicon body produced by shaping silicon powder having an average particle size less than 0.2 micron into a green body having a density of at least 30% of the theoretical density of silicon and sintering the body to a density of at least 60% of the theoretical density of silicon, and which by reference, is incorporated herein.

In the present invention, boron is used as a densifying additive. Briefly stated, the present invention comprises forming a particulate mixture of silicon powder having an average particle size of less than 3 microns and boron in an amount ranging from 0.1% by weight to 5% by weight of the silicon powder, shaping the particulate mixture into a green body with a density of at least about 30% of the theoretical density of silicon, and sintering the body by liquid or solid state sintering producing a sintered body having a density of at least 60% of the theoretical density of silicon.

In the present invention, the density of the green body and that of the sintered body is given as a fractional density of the theoretical density of silicon.

Preferably, particles of pure silicon are used in the present invention. These particles may have oxygen adsorbed, or have a thin oxide film on their surfaces. Oxygen is not considered a contaminant since during heat up to sintering temperature it is eliminated as silicon monoxide before sintering is initiated and the resulting sintered product is free of oxygen or may contain oxygen in trace amount which has no significant deteriorating effect on its properties. Usually, the composition of the starting silicon powder is at least about 97% by weight pure silicon with oxygen on its surfaces up to about 3% by weight of the composition. For some applications of the sintered product, the starting silicon particles must be free of metallic and non-metallic impurities, other than oxygen, but for a number of product applications, the starting silicon powder may contain traces of metallic and non-metallic impurities which do not affect the sintering process or the properties of the sintered product deleteriously for the particular application. However, to insure against deleterious effects, the total amount of such impurities should not be greater than 0.05% by weight of the composition of the starting powder.

The present fine sized starting silicon powder can be prepared by a number of techniques. Generally, chemical techniques are most useful for preparing the silicon powder smaller than 0.5 micron. One technique involves reacting silicon-containing compounds with hydrogen such as the following reactions with silicon tetrachloride and trichlorosilane:

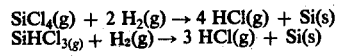

Additional techniques involve the pyrolytic decomposition of silicon-containing compounds such as the following thermal decompositions of trichlorosilane, silane, silicon tetrachloride and silicon dichloride, respectively:

$$SiHCl_3(g) \rightarrow HCl(g) + Si(s) + Cl_2(g)$$
$$SiH_4(g) \rightarrow Si(s) + 2 H_2(g)$$
$$SiCl_4(g) \rightarrow Si(s) + 2 Cl_2(g)$$
$$2 SiCl_2(g) \rightarrow Si(s) + SiCl_4(g)$$

Generally, in chemical techniques used to produce the present silicon powder, lower reaction or decomposition temperatures ordinarily produce a powder which is significantly more amorphous and finer than that produced at higher temperatures. In a specific reaction or decomposition process for producing the silicon powder, modification of processing steps such as gas flow and/or temperature can be used to modify the characteristics of the silicon powder produced. The silicon powder is recoverable by a number of techniques. For example, as it is formed, it can be deposited on a suitable substrate such as a silica tube from which it can be scraped or it can be caught in a trap and recovered therefrom.

Mechanical techniques are useful for preparing silicon powder ranging from about 0.2 micron to 3 microns. Representative of these techniques is jet milling, wet ball milling and vibratory milling. The silicon powder can be jet milled in air, or preferably, in nitrogen or other inert gas such as argon to prevent excessive oxide formation. Ball milling should be carried out in a non-reactive liquid medium such as ethyl alcohol or benzene. Vibratory milling can be carried out either dry or wet.

The silicon powders produced by chemical or mechanical techniques may contain particulate impurities but it can be purified by conventional methods such as by leaching with an appropriate acid such as hydrofluoric acid, a mixture of hydrofluoric and nitric acids, or aqua regia.

The present silicon powder can range in structure from amorphous to crystalline. Preferably, it is amorphous or poorly crystalline, as determined by X-ray diffraction analysis and differential thermal analysis, since shrinkage or densification ordinarily increases with increasing amorphism of the starting silicon powder under identical experimental conditions. In the present invention, a poorly crystalline silicon powder is one having a crystallinity content less than about 50% by volume of the powder.

The present silicon powder has an average particle size of less than 3 microns. Silicon powder having an average particle size larger than 3 microns is not useful because it cannot be densified by sintering in the present process to a density of 60%. Silicon powder having an average particle size less than 0.2 micron is preferred since it provides a larger surface area, and the larger the surface area, the greater is shrinkage or densification of the body during sintering.

In the present process, elemental boron having an average particle size of less than 3 microns is used. Preferably, it is of the same size or finer in size than that of the silicon powder so that a more uniform mixture can be produced promoting the solution of boron in silicon at a faster rate due to the greater surface area of the finer sized boron.

The amount of elemental boron which is useful in the present process ranges from 0.1% by weight to 5% by weight of the silicon, with the particular amount of boron used for the production of the present sintered product having particular properties being determinable empirically. Amounts of boron smaller than 0.1% by weight of the silicon powder provide no significant advantage. Amounts of boron larger than 5% by weight of silicon provide no advantage and may form an excessive amount of $SiB_4$ phase.

Boron enters into solid solution with silicon at a rate which increases with increasing temperatures ranging from about 1200° C to 1350° C, and at a temperature of 1350° C, the solubility limit of boron in an amount of 0.46% by weight of the silicon is reached. At a temperature ranging from about 1390° C up to a temperature below the melting point of silicon, boron forms a liquid eutectic with silicon. At temperatures of 1250° C up to a temperature below the eutectic temperature of about 1390° C, solid state sintering of the compact takes place, and at the eutectic temperature of about 1390° C up to a temperature below the melting point of silicon, liquid state sintering takes place.

Elemental boron is, then, effective as a sintering or densifying aid in the present process when it is in solid solution with the silicon host or matrix at temperatures below the boron-silicon eutectic temperature, and when it creates a liquid phase at temperatures at or above the eutectic temperature but below the temperature at which silicon melts.

X-ray diffraction analysis reveals the lattice parameter of boron doped silicon is always appreciably smaller than that of pure silicon when fired under identical conditions. The smaller lattice parameter of the boron doped sintered material is related to the small atomic radius of boron (0.88 Angstroms) as compared to the atomic radius of the silicon atom which is 1.18 Angstroms.

For solid state sintering, which is carried out at a temperature ranging from 1250° C to a temperature below 1390° C, the preferred amount of boron is the maximum amount of boron which is soluble in the silicon at the sintering temperature and ranges from about 0.1% by weight to 0.46% by weight of the silicon. Specifically, since boron is increasingly effective as a densifying agent with increasing amounts of boron in solid solution with the silicon host or matrix, the solid state sintering rate of the present green body increases significantly with increasing amounts of boron in solid solution up to the solubility limit. For example, at boron concentrations greater than 0.46% by weight of the silicon at sintering temperatures ranging from 1350° C to below 1390° C, the densification rate tends to level out becoming independent of the amount of boron beyond that point.

For liquid state sintering, which is carried out at a temperature ranging from the boron-silicon eutectic temperature of 1390° C up to a temperature below the temperature at which silicon melts, the amount of boron used should range from about 0.3% by weight to 5% by weight of the silicon, and preferably, from about 0.3% by weight to about 0.46% by weight of the silicon. Amounts of boron less than about 0.3% by weight are less satisfactory since they will form a very large volume of liquid phase within a very narrow temperature range frequently leading to complete melting or major deformation of the compact.

In both solid and liquid phase sintering, boron in an amount in excess of abot 0.46% by weight of the silicon reacts with the silicon to form a second phase which is $SiB_4$. However, in the present process, some $SiB_4$ phase could precipitate out on very slow cooling from the sintering temperature with amounts of boron ranging down to the minimum amount of 0.1 weight percent of silicon. Specifically, an amount of boron up to 5% by weight of the silicon will produce the $SiB_4$ phase in an amount up to 7.5% by volume of the total solid phase of the sintered body. This amount of the SiB$_4$ phase does not affect the properties of the sintered product deleteriously for a number of applications such as support materials for silicon wafers where high boron doping levels are desired. In the present sintered product, the SiB$_4$ phase is distributed at least significantly or at least substantially uniformly throughout the sintered body. In addition, the SiB$_4$ phase is of a size which is substantially the same or finer than the average particle size of the silicon grains and it is coherently bonded to the silicon matrix.

The boron in solid solution is distributed at least significantly or substantially uniformly throughout the present sintered product. Specifically, boron in solid solution with silicon increases the sintering rate of the compact significantly allowing the use of sintering temperatures lower than those required when no boron is used. Also, boron increases the degree of densification and produces sintered products of a density significantly higher than those produced with no boron under the same conditions. In addition, boron makes possible the densification of larger particle size silicon powder by sintering to a density of at least 60% which, without boron and under identical conditions, cannot be sintered to such density. Since boron retards grain growth and surface diffusion in the silicon compact, it enhances volume diffusion which is responsible for densification during sintering.

For best results, the boron particles should be admixed with the silicon powder to form at least a significantly uniform or at least a substantially uniform mixture. The boron can be admixed with the silicon powder by mechanical techniques or it can be formed in situ. Representative of mechanical techniques is jet milling, wet ball milling and vibratory milling. The particulate mixture can be jet milled in air, or preferably in nitrogen or other inert gas such as argon to prevent excessive oxide formation. Ball milling should be carried out in a non-reactive liquid medium such as ethyl alcohol or benzene. Vibratory milling can be carried out either dry or wet. Alternatively, elemental boron can be introduced, for example, in the gas phase by mixing B$_2$H$_6$ with SiH$_4$ and pyrolyzing the gaseous mixture to produce a mixture of boron and silicon powder.

A number of techniques can be used to shape the particulate mixture of powders of silicon and boron into a green body. For example, the mixture can be extruded, injection molded, die-pressed, isostatically pressed or slip cast to produce the green body of desired shape. Any lubricants, binders or similar materials used in shaping the mixture should have no significant deteriorating effect on the properties of the green body or the resulting sintered body and should be completely or substantially completely removable such as by vaporization or leaching before sintering is initiated. Such materials are preferably of the type which evaporate on heating at relatively low temperatures, preferably below 400° C, leaving no significant residue.

The density of the green body can range from about 30% to the maximum attainable, which is generally about 60%. The higher the green density, the greater is the final density achievable in the sintered product. Specifically, the green density should be at least 30% to produce a sintered product having a density of at least 60% and a green density of at least 40% is required to produce a sintered product having a density substantially higher than 60%.

In the present process, in the solid state sintering embodiment, since the finer the powder the more it shrinks during sintering, a green body having a density ranging from 30% to 35% must necessarily be composed of silicon powder which has an average particle size less than 0.2 micron but which can range in structure from amorphous to completely crystalline to produce a sintered product having the required density of at least 60%. For solid state sintering, as the density of the green body is increased, silicon powder of correspondingly larger particle size can be used, and in a green body having a density of at least 40%, silicon powder ranging up to a particle size of one micron or less is sinterable to a density of at least 60%. However, to produce a sintered product having a density ranging from 92% to 100% by solid state sintering, the green body must have a density of at least 40% and the starting silicon powder must be amorphous or poorly crystalline and have a particle size less than 0.2 micron.

In the liquid state sintering embodiment of the present process, the silicon powder is less than 3 microns and the green body can have a density of 30%, but preferably, 40%. However, silicon powder having an average particle size ranging from greater than 1 micron up to less than 3 microns can be densified in the present process only by liquid phase sintering to produce a sintered product ranging in density from 60% to 100%.

Sintering is carried out at a temperature ranging from 1250° C to below the molting point of silicon which is about 1410° C. For solid state sintering, as a practical matter, sintering temperature ranges from 1300° C to about 1380° C and preferably from 1350° C to 1380° C to increase the rate of solid state sintering. The particular sintering temperature is determinable empirically and depends largely on particle size, amount of boron, density of the green body, and final density desired in the sintered product, with higher final densities requiring higher sintering temperatures. Specifically, the smaller the size of the particles in the green body and the higher its density, the lower is the required sintering temperature. Sintering temperatres lower than 1250° C do not produce the present sintered bodies with a density of at least 60%.

Sintering of the green body is carried out in an atmosphere in which it is substantially inert, i.e. an atmosphere which has no significant deteriorating effect on its properties such as, for example, argon, helium or a vacuum. The sintering atmosphere can range from a substantial vacuum to atmospheric pressure, but as a practical matter, it is preferably at atmospheric pressure. Preferably, the sintering atmosphere is a flowing atmosphere. However, generally for relatively small pieces, the present sintering can be carried out in stagnant atmospheres or in closed systems.

One preferred embodiment of the present invention comprises shaping a uniform mixture of silicon powder having an average particle size ranging from 0.05 micron to 0.1 micron and boron ranging in average particle size up to 1 micron into a green body having a density of at least 40% and sintering the body at a temperature ranging from 1300° C to 1380° C to produce a sintered product having a density of at least 92% or higher and wherein substantially all the pores are closed pores.

The polycrystalline sintered body of the present invention has a density of at least 60% and consists essentially of silicon and boron in solid solution with the silicon, or it consists essentially of silicon with boron in solid solution with the silicon and an SiB$_4$ phase. The silicon grains are equiaxed or substantially equiaxed and have an average grain size ranging up to about 8 microns. The grains are of significantly or substantially uniform size and are distributed at least significantly or at least substantially uniformly throughout the sintered body. The pores, have an average size, i.e., pore diameter, ranging up to about 10 microns and are of significantly or substantially uniform size and are distributed at least significantly or at least substantially uniformly throughout the body. In the preferred embodiment of the present invention, the grains and pores of the sintered body are of about the same size or generally within a factor of two.

The particular average grain size of the sintered body depends largely on the average particle size of the silicon powder, the density of the green body and sintering temperature. In the preferred embodiment, the polycrystalline sintered body has an average grain size and average pore size of about 1 micron or smaller. Specifically, silicon powder having an average particle size less than 0.1 micron shaped into a green body having a density of at least 30% produces a sintered product having an average grain size as well as an average pore diameter of about 0.5 micron or smaller, i.e., as small as about 0.1 micron, when the sintering temperature is not higher than 1375° C. On the other hand, silicon powder having an average particle size ranging from 0.1 micron to less than 0.2 micron shaped into a green body having a density of at least 30% and sintered at a temperature ranging from about 1350° C to a temperature below 1390° C produces a sintered product having an average grain size ranging from 1 micron to 8 microns, and usually from 1 micron to 6 microns.

When the present polycrystalline sintered body has a density ranging from 60% to about 85%, substantially all or a major portion of the pores are interconnecting with interconnectivity decreasing with increasing density. As the density of the sintered body exceeds 85%, the interconnectivity of the pores decreases substantially, and at a density of about 92% or higher all or substantially all of the residual pores are closed.

Polycrystalline sintered bodies of the present invention having a density of at least about 92% or higher and wherein all or substantially all of the residual pores are closed are gas tight and substantially stable in a number of atmospheres at elevated temperatures such as, for example, oxidizing atmospheres at temperatures ranging up to a temperature below the melting point of the silicon.

The present invention provides a number of advantages. For example, with standard power processing techniques, large shapes (plates, disks, boats, crucibles, tubes) and sizes can be fabricated during the powder compaction step before sintering so that machining costs are minimized or virtually absent.

The present invention makes it possible to fabricate complex shaped articles of polycrystalline silicon directly which heretofore could not be manufactured or required expensive machining because of the complex geometries desired of the material. Specifically, the present sintered product can be made in the form of a useful shaped article such as an impervious crucible, a thin walled tube, a long rod, a spherical body, or a hollow shaped article. The dimensions of the present sintered product differ from those of its green body by the extent of shrinkage, i.e. densification, which occurs during sintering.

The sintered products of the present invention are polycrystalline wherein the grains are randomly oriented. Specifically, when the present products are cross-sectioned and polished and the polished surfaces subjected to an X-ray beam, they give a typical X-ray diffraction pattern which corresponds with a random arrangement of silicon crystals designated in the ASTM card file. It is random because the relative intensities of the peaks observed in the X-ray diffraction pattern of the present products corresponds directly with the known ASTM card file of silicon showing that it is random and polycrystalline. In contrast to preferred grain orientation, the random orientation of the grains of the present product enables it to have significantly less residual stress, and therefore, higher mechanical strength.

The present polycrystalline sintered body in the lower density range is particularly useful for forming dense silicon nitride as disclosed in copending U.S. Patent application Ser. No. 646,967 entitled "Si$_3$N$_4$ Formed by Nitridation of Sintered Silicon Compact Containing Boron" filed of even date herewith in the names of Charles D. Greskovich and Svante Prochazka and assigned to the assignee hereof. Specifically, in this copending application, gaseous nitrogen is passed through the interconnecting pores of the sintered body ranging in density from 60% to about 75% and reacted with the silicon to form a dense body of Si$_3$N$_4$.

In the present invention green bodies having a density higher than 58% should be densified during sintering by at least 2% to produce a sintered body with a minimum density higher than 60%. For example, a 60% dense green body should be sintered to a density of at least 62%. Such densification is necessary to get sufficient development of the microstructure for satisfactory reaction with nitrogen in copending U.S. Patent application Ser. No. 646,967. Specifically, in addition to imparting significant mechanical strength to the body, such densification rounds off the pores and makes them more uniform in size and more uniformly distributed throughout the body permitting nitrogen gas to be transported throughout the body substantially more uniformly and at a rate substantially faster than that in the unsintered compact or green body where the pores are more non-uniform and irregularly shaped and frequently non-uniformly distributed in the body thereby retarding the rate of penetration of nitrogen gas into the interior of the compact. Such retardation of nitrogen causes sufficient formation of silicon nitride to block the pores in the outer surface areas of the body before the nitrogen can reach the central portion of the body thereby leaving a significant or substantial fraction of the silicon unreacted.

The present polycrystalline sintered body having a density ranging from about 75% to 92% is useful as a support material in the processing of single crystal silicon wafers when the atmosphere used is, for example, a vacuum or a flowing inert atmosphere so that any gases adsorbed on the surfaces on interconnecting pores would be removed before the required high temperature was reached to prevent contamination of the wafers. The present sintered body with a density ranging from 75% to 92% is also useful for forming a composite by reaction of its outer exposed surface with gaseous nitrogen to produce a zone of silicon nitride which substantially encapsulates the sintered body. Such a composite is also useful as a support material for single crystal silicon wafers.

The sintered bodies with a density higher than 92% of the theoretical density of silicon have applications (1) in the silicon semiconductor industry as high purity, high strength tubes and boats and other support material for single crystal silicon wafers during high temperature diffusion and oxidation processes, and (2) as high purity, polycrystalline silicon rods used as stock material from which single crystal silicon is grown by the floating zone method, and (3) as crucibles, containers and reaction chambers for very corrosive liquids such as acids, alkalies and sulfides at room temperature or elevated temperature in reducing, oxidizing and neutral atmospheres or vacuum.

EXAMPLES

For Examples 1, 2 and 7 of Table I, the crystalline silicon powder was prepared by crushing a high purity, single crystal boule of silicon with a Cu mortar and pestle followed by sieving through a −325 mesh brass screen, leaching in aqua regia to remove metal contamination, washing with distilled water, and drying. This powder was fed into a jet mill and the fines collected. The stucture of the collection system was slightly modified to permit powders, with an average particle size of 1.35 microns and 0.23 micron, to be collected in different regions. Typical chemical analysis of these powders showed them to be greater than 99.5% by weight pure silicon with the major impurities (in ppm) being O (2000), B (300), Cu (100), Fe (100) and Ni (100). Scanning Electron Microscope (SEM) photomicrographs showed that the powder particles were angular and nonagglomerated.

In the remaining Examples of Table I, the silicon powder was prepared by the thermal decomposition of silane, $SiH_4$, between 600° C and 700° C in a gradient furnace comprised of an open-end fused silica tube passing through a furnace. The following reaction takes place:

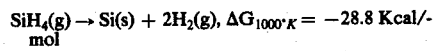

$$SiH_4(g) \rightarrow Si(s) + 2H_2(g), \Delta G_{1000°K} = -28.8 \text{ Kcal/mol}$$

The source of silane was a 4% silane + 96% helium "calibration mixture". This gaseous mixture was flowed into the tube most of which, except for the open end portions, was located inside the furnace. The tube was thoroughly flushed with argon before the introduction of the gaseous mixture into the hot tube. The silicon powder (or smoke) deposited on the inner wall of the tube. The powder was scraped from the wall and characterized by X-ray diffraction and SEM analyses, surface area measurements and sintering experiments.

Two experimental runs were made, and silicon powders prepared from these runs were designated Si-1 and Si-2. Si-1 powder was prepared by using a gas flow rate of 0.5 standard cubic feet per hour (SCFPH) and a maximum furnace temperature of 700° C. Si-2 powder was prepared with a gas flow rate of 2 SCFPH and a maximum furnace temperature of 650° C. The color of Si-1 powder was dark brown. Si-2 powder was inhomogeneously brownish-grey in color. Since the powders were prepared in a temperature gradient furnace, these powders were believed to be inhomogeneous with respect to particle size, morphology and crystallinity. Therefore, a portion of each powder was given an isothermal anneal at 700° C in flowing Ar for 60 minutes. After the annealing treatment, the color of the Si-1 powder turned light brown while that of Si-2 powder turned dark brown to yellowish brown. X-ray diffraction analysis of these powders showed that Si-1 powder was amorphous in the "as-prepared" form but partly or poorly crystallized after the isothermal anneal at 700° C. Preliminary X-ray results on Si-2 powder show it to be partly or poorly crystalline in the "as-prepared" state as well as in the annealed state after the isothermal treatment at 700° C. All of the powders were greater than 99.5% by weight pure silicon with the major impurity being oxygen. The amorphous "as-prepared" Si-1 powder was used in Examples 5 and 6. The annealed, poorly crystallized Si-2 powder was used in Examples 3 and 4.

Significantly uniform powder mixtures of silicon powder and elemental boron powder were prepared by admixing boron having an average particle size of about 0.01 micron with the silicon powder in acetone in a closed plastic bottle on a mixer mill for 30 minutes. The resulting mixture was dried in air at a temperature of about 110° C. In Example 7, elemental carbon powder in an amount of 0.2% by weight of the silicon and having an average particle size of 0.01 micron was admixed along with the boron.

In the Examples of Table I, powder compacts were preshaped from each powder or powder mixture without binders into disks in a double-acting carboloy die at 5000 psi and then hydrostatically pressed at 30,000 psi. Their green densities are shown in Table I. Specifically, the disks were of substantially the same size, generally about 1 cm in diameter and about ½ cm in thickness. The disks, i.e. green bodies, were sintered for 60 minutes at the sintering temperatures shown in Table I. In all of the Examples the sintering atmosphere was flowing prepurified argon using a gas flow rate of 2 SCFPH, and the sintering treatment was done in a platinum wound resistance furnace having an $Al_2O_3$ insert tube. The results are shown in Table I. In Table I, Linear Shrinkage $(\Delta L/L_o)(\%)$ is the difference in length between the green body and the sintered body, $\Delta L$, divided by the length of the green body $L_o$.

TABLE I

| | SILICON POWDER | | | | SINTERED PRODUCT | | | | |
|---|---|---|---|---|---|---|---|---|---|
| Ex. | Structure | Average Particle Size (micron) | Boron % by wt. of Silicon | Green Density % | Sintering Temp. (° C) | Density (%) | Linear Shrinkage $\frac{\Delta L}{L_o}$ (%) | Average Grain Size (micron) | Average Pore Size (micron) | Microstructure |
| 1 | Crystalline | 1.3 | 0.46 | 56 | 1350 | 57 | ∼0.5 | 7 | 6 | Non-uniform distribution of equiaxed grains and pores. Open porosity. |
| 2 | " | 0.23 | 0.46 | 55 | " | 61 | 4 | 2 | 2 | Uniform distribution of grains & pores. Equiaxed grains, open porosity. |
| 3 | Poorly crystalline | 0.17 | " | 48 | " | 86 | 17.3 | <2 | <5 | Bimodal distribution of grains and pores. By volume, 50% open porosity and 40% closed pores. |
| 4 | " | 0.17 | none | 48 | " | 61 | 5 | 3–4 | 6 | Uniform distribution of equiaxed grains and pores. |

TABLE I-continued

| Ex. | SILICON POWDER Structure | Average Particle Size (micron) | Boron % by wt. of Silicon | Green Density % | Sintering Temp. (° C) | SINTERED PRODUCT Density (%) | Linear Shrinkage $\frac{\Delta L}{L_o}$ (%) | Average Grain Size (micron) | Average Pore Size (micron) | Microstructure |
|---|---|---|---|---|---|---|---|---|---|---|
| 5 | Amorphous | 0.06 | 0.46 | 43 | 1375 | 99.6 | 24.5 | ~0.5 | ~0.5 | Open porosity. Uniform distribution of closed pores and equiaxed grains. |
| 6 | " | " | none | " | " | 98.5 | 24.2 | " | " | " |
| 7 | Crystalline | 0.23 | 1 and (0.2C) | 55 | 1391 | 99.2 | 18 | 5 | 2 | Uniform size distribution of grains and pores. Fine dispersion of SiB$_4$ particles having a size less than 1μ. |

In Table I, Examples 2, 3, 5 and 7 illustrate the present invention. Specifically, in Example 1 the silicon powder particles were too large for solid state sintering to sinter sufficiently to the required density of 60%.

Example 2 shows the sintering of a large particle size silicon which without boron cannot be densified by sintering to a 60% density. Specifically, in Example 2, 39% by volume of the sintered body was comprised of interconnecting pores open to the surface of the body. The microstructure of the sintered product of Example 2 is shown in FIG. 1 where the pores are the black phase and the grains are the white phase.

In addition, in the sintered bodies of Examples 2, 3, and 5, all of the boron has gone into solid solution as evidenced by FIG. 1 as well as by X-ray diffraction experiments which did not show any boron or any boron bearing second phase.

A comparison of Example 3 where boron was used with Example 4 which was carried out in the same manner but without boron, shows that the sintered product of Example 3 had a substantially higher density. Although Example 3 produced a sintered product with a bimodal distribution of grains and pores, the reason for this was believed to be due to a non-uniform distribution of boron particles in the initial silicon-boron powder mixture.

A comparison of Example 5 where boron was used with Example 6 shows the higher density obtained with boron under the same conditions.

Example 7 illustrates liquid phase sintering and although 0.2% by weight of carbon had been admixed with the starting silicon-boron powder mixture, there was no detectable evidence of the carbon in the final sintered product. Other sintering experiments carried out in accordance with the present process but which also had such elemental carbon admixed in the starting powder mixture showed that the elemental carbon provided no advantage in the present process.

The sintered products of Table I were examined in a standard metallographic manner.

The sintered products of Examples 2, 3, 5 and 7 which illustrate the present invention, did not exhibit any evidence of microcracks or residual stresses.

In addition, the sintered products of Examples 2 and 5 were cross-sectioned, polished and the polished surfaces subjected to X-ray diffraction analysis and chemical etching experiments and were determined to be polycrystalline with randomly oriented grains.

In copending U.S. patent application Ser. No. 646,764 entitled "Si$_3$N$_4$ Formed By Nitridation Of Sintered Silicon Compact" filed of even date herewith in the names of Charles D. Greskovich and Svante Prochazka and assigned to the assignee hereof, there is disclosed a dense polycrystalline silicon nitride body produced by nitridation of a polycrystalline sintered silicon article of certain density.

What is claimed is:

1. A process for producing a polycrystalline sintered body of silicon which comprises forming a particulate mixture of silicon powder and boron, said silicon powder and boron having an average particle size less than 3 microns, said boron being present in an amount ranging from 0.1% by weight to 5% by weight of said silicon powder, shaping said mixture into a green body having a density of at least 30% of the theoretical density of silicon, and sintering the green body at a temperature ranging from 1250° C to a temperature below the melting point of silicon in an atmosphere which has no significant deteriorating effect on the green body or the resulting sintered body to produce a sintered body having a density of at least 60% of the theoretical density of silicon, and sintering densifying said green body in an amount of at least 2%.

2. A process for producing a polycrystalline sintered body of silicon according to claim 1 wherein said boron is present in an amount ranging from 0.1% by weight to about 0.46% by weight of said silicon powder and said sintering temperature ranges from 1300° C to a temperature below 1390° C.

3. A process for producing a polycrystalline sintered body of silicon according to claim 1 wherein said silicon powder has an average particle size ranging from about 1 micron to less than 3 microns, and said boron being present in a minimum amount of 0.3% by weight of said silicon, said sintering temperature ranges from the temperature at which boron forms a liquid eutectic with silicon which is about 1390° C to a temperature below the melting point of silicon.

4. A process for producing a polycrystalline sintered body of silicon which comprises forming a particulate mixture of silicon powder having an average particle size less than 0.2 micron and boron, said boron having an average particle size less than 1 micron and being present in an amount ranging from 0.1% by weight to 5% by weight of said silicon powder, shaping said mixture into a green body having a density of at least 40% of the theoretical density of silicon, and sintering the green body at a temperature ranging from 1300° C to 1380° C in an atmosphere which has no significant deteriorating effect on the green body or the resulting sintered body to produce a sintered body having a density of at least 60% of the theoretical density of silicon, said sintering densifying said green body in an amount of at least 2%.

5. A process for producing a polycrystalline sintered body of silicon according to claim 4 wherein said boron is present in an amount ranging from 0.1% by weight to about 0.46% by weight of said silicon powder.

6. A polycrystalline sintered body consisting essentially of silicon and boron in solid solution with said silicon, or consisting essentially of silicon and boron in solid solution with said silicon and an $SiB_4$ phase, said boron in solid solution ranging from 0.1% by weight to 0.46% by weight of said silicon, said $SiB_4$ phase being present in an amount ranging up to 7.5% by volume of the total solid phase of said sintered body, said $SiB_4$ phase being distributed at least significantly uniformly throughout said sintered body and being of a size which is substantially the same or finer than the average size of said silicon grains, said sintered body having a density of at least 60% of the theoretical density of silicon, said sintered body having an average grain size ranging up to about 8 microns and an average pore size ranging up to about 10 microns, said silicon grains being at least substantially equiaxed and of a significantly uniform size.

7. A polycrystalline sintered body of silicon according to claim 6 wherein said density ranges from 60% to about 75% of the theoretical density of silicon and wherein at least a major portion of the pores are interconnecting and open to the surface of said body.

8. A polycrystalline sintered body of silicon according to claim 6 wherein the density is at least 92% of the theoretical density of silicon and wherein all or substantially all of the residual pores are closed pores.

9. A polycrystalline sintered body consisting essentially of silicon and boron in solid solution with said silicon, or consisting essentially of boron in solid solution with said silicon and an $SiB_4$ phase, said boron in solid solution ranging from 0.1% by weight to 0.46% by weight of said silicon, said $SiB_4$ phase being present in an amount ranging up to 7.5% by volume of the total solid phase of said sintered body, said $SiB_4$ phase being distributed at least significantly uniformly throughout said sintered body and being of a size which is substantially the same or finer than the average size of said silicon grains, said sintered body having a density of at least 92% of the theoretical density of silicon, said sintered body having an average grain size and an average pore size of 1 micron or less, said grains and pores being of significantly uniform size and being distributed significantly uniformly throughout said body.

* * * * *